United States Patent
Liu et al.

(10) Patent No.: US 9,690,766 B2
(45) Date of Patent: Jun. 27, 2017

(54) METHOD FOR GENERATING RANDOM CONTENT FOR AN ARTICLE

(71) Applicant: Chengnan Liu, San Gabriel, CA (US)

(72) Inventors: Chengnan Liu, San Gabriel, CA (US); Christopher Kuhn, Temecula, CA (US)

(*) Notice: Subject to any disclaimer, the term of this patent is extended or adjusted under 35 U.S.C. 154(b) by 331 days.

(21) Appl. No.: 14/586,407

(22) Filed: Dec. 30, 2014

(65) Prior Publication Data

US 2016/0188554 A1 Jun. 30, 2016

(51) Int. Cl.
*G06F 17/24* (2006.01)
*G06F 17/27* (2006.01)

(52) U.S. Cl.
CPC .......... *G06F 17/24* (2013.01); *G06F 17/2735* (2013.01)

(58) Field of Classification Search
None
See application file for complete search history.

(56) References Cited

U.S. PATENT DOCUMENTS

| | | | |
|---|---|---|---|
| 5,995,934 A | 11/1999 | Tang | |
| 6,735,239 B1 | 5/2004 | Niegel | |
| 6,934,388 B1 | 8/2005 | Clark | |
| 7,000,076 B2 | 2/2006 | Rowlands | |
| 7,392,213 B2 | 6/2008 | Merkoulovitch | |
| 8,161,329 B2 | 4/2012 | Ramakrishnan | |
| 2003/0007637 A1* | 1/2003 | Banks | G06F 17/30864 380/51 |
| 2007/0147608 A1 | 6/2007 | Mainguet | |
| 2012/0302304 A1* | 11/2012 | Steir | A63F 3/0423 463/9 |
| 2013/0304604 A1* | 11/2013 | Hoffman | G06Q 30/0621 705/26.5 |
| 2014/0120519 A1 | 5/2014 | Magee | |

FOREIGN PATENT DOCUMENTS

EP    0488492 A2    3/1992

* cited by examiner

*Primary Examiner* — Stephen Hong
*Assistant Examiner* — Sanchita Roy
(74) *Attorney, Agent, or Firm* — Eric Kelly

(57) ABSTRACT

A method for generating random content for applying said generated random content to a surface of an article and/or as content for a screen saver type of use may be described and disclosed. Randomized elements generated may be selected from one or more of the group comprising: logographs of an Asian alphabet, logographs of a Chinese alphabet, letters of a letter based alphabet, words from a dictionary, and the like. The article may comprise a tangible physical object capable of surface ornamentation. For example, and without limiting the scope of the present invention, the article may be selected from the group comprising: walls, canvas, paper, wall paper, vinyl, plastics, stickers, decals, fabric, textiles, upholstery, clothing, apparel, drinking glasses, and the like.

16 Claims, 3 Drawing Sheets

US 9,690,766 B2

METHOD FOR GENERATING RANDOM CONTENT FOR AN ARTICLE

PRIORITY NOTICE

The present application is a non-provisional patent application and makes no claims of priority.

CROSS REFERENCE TO RELATED PATENT APPLICATIONS

The present application makes no reference to any other related filed patent applications.

STATEMENT REGARDING FEDERAL SPONSORSHIP

No part of this invention was a result of any federally sponsored research.

TECHNICAL FIELD OF THE INVENTION

The present invention relates in general to various methods for generating randomized content for use in artwork and for use on various article surfaces; and more specifically to methods for generating random lists of logographs, letters, and words, including Asian logographs such as Chinese logographs and other Asian logographs, wherein such random generated lists may be content for use in artwork and/or as a covering for various article surfaces.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Presently most of the prior art related to random content generators is related to applications for use circuits, software, telecommunications, and encryption, e.g. in generating various passwords. For example, one prior art reference may teach a method for producing random generated messages that may then be used in validating/testing various software modules. While such a produced message may be random, the message may have defined meaning and/or a defined purpose for validating/testing various software modules.

The prior art appears to be devoid of a random content generator, wherein the produced random content may have no intended literary meaning and wherein the produced random content may have an express purpose for use on a surface of a tangible article and/or as content for a screen saver type of use.

Further, the prior art appears to be devoid of a random content generator, wherein the produced random content may be of random Asian logographs (characters), and wherein that produced random content may have no intended literary meaning and wherein that produced random content may have the express purpose for use on the surface of the tangible article and/or as content for a screen saver type of use.

There is a need in the art for a method of random content generation, wherein the produced random content may have no intended literary meaning and wherein the produced random content may be affixed on the surface of the tangible article and/or used as content for a screen saver type of use.

It is to these ends that the present invention has been developed.

BRIEF SUMMARY OF THE INVENTION

To minimize the limitations in the prior art, and to minimize other limitations that will be apparent upon reading and understanding the present specification, the present invention may describe a method for generating random content for applying (affixing) said generated random content to a surface of an article and/or as content for a screen saver type of use.

In some embodiments, aspects of the method may be a document processing method that may take a body of text as an input and produce a body of text as an output. That output text may contain elements (such as logographs and/or words) selected (generated) in a random order from an original order as found in the input text. This output text may then be affixed on the surface of the tangible article and/or used as content in a screen saver type of use.

An intent of the method may be to take as input any appropriate list (string) of elements and produce an output list (string) of those elements in a random order, wherein that generated random order of element may then be applied to (affixed) the surface of the article and/or used as content in a screen saver type of use.

In some embodiments, the elements may be selected from one or more of the group comprising: at least some logographs of an Asian alphabet, at least some logographs of a Chinese alphabet, at least some logographs of a Japanese alphabet, at least some logographs of a Korean alphabet, at least some logographs from a logograph based alphabet, at least some letters of a letter based alphabet, at least some words from a dictionary, and the like.

In some embodiments, the article may comprise a tangible physical object capable of surface ornamentation. For example, and without limiting the scope of the present invention, the article may be selected from the group comprising one or more of: a wall, a canvas, paper, wall paper, vinyl (e.g. for various vinyl wraps, including vehicle vinyl wraps), plastics, a sticker, a decal, fabric, textiles, upholstery, clothing, apparel, t-shirts, hats, baseball caps, bandanas, scarfs, jackets, coffee mugs, drinking glasses, wallets, and the like.

It is an objective of the present invention to provide a method for generating random content.

It is another objective of the present invention to provide a method for generating random content, wherein the produced random content may have no literary meaning.

It is another objective of the present invention to provide a method for generating random content, wherein the produced random content may have no duplicated nor repetitive element in the produced random content.

It is another objective of the present invention to provide a method for generating random content, wherein an input source to the method may be an entirety or some smaller subset of an Asian logograph alphabet, i.e. a recognized chart or subset of Asian characters may serve as the input source.

It is another objective of the present invention to provide a method for generating random content, wherein the output to the method may be the entirety or some smaller subset of an Asian logograph alphabet, i.e. a recognized chart or subset of Asian characters may appear in the output, but in a random order.

It is another objective of the present invention to provide a method for generating random content, wherein the output to the method may be the entirety or some smaller subset of an Asian logograph alphabet, i.e. a recognized chart or subset of Asian characters may appear in the output, but in a random order and with no duplicated logographs in the output.

It is another objective of the present invention to provide a method for generating random content, wherein the output to the method may be the entirety or some smaller subset of an Asian logograph alphabet, i.e. a recognized chart or subset of Asian characters may appear in the output, but in a random order and with minimal literary meaning in the output.

It is yet another objective of the present invention to provide a method for generating random content, wherein the output may serve as a basis for reproducing that content in the output on the surface of the article and/or as content for use in a screen saver type of use.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1:
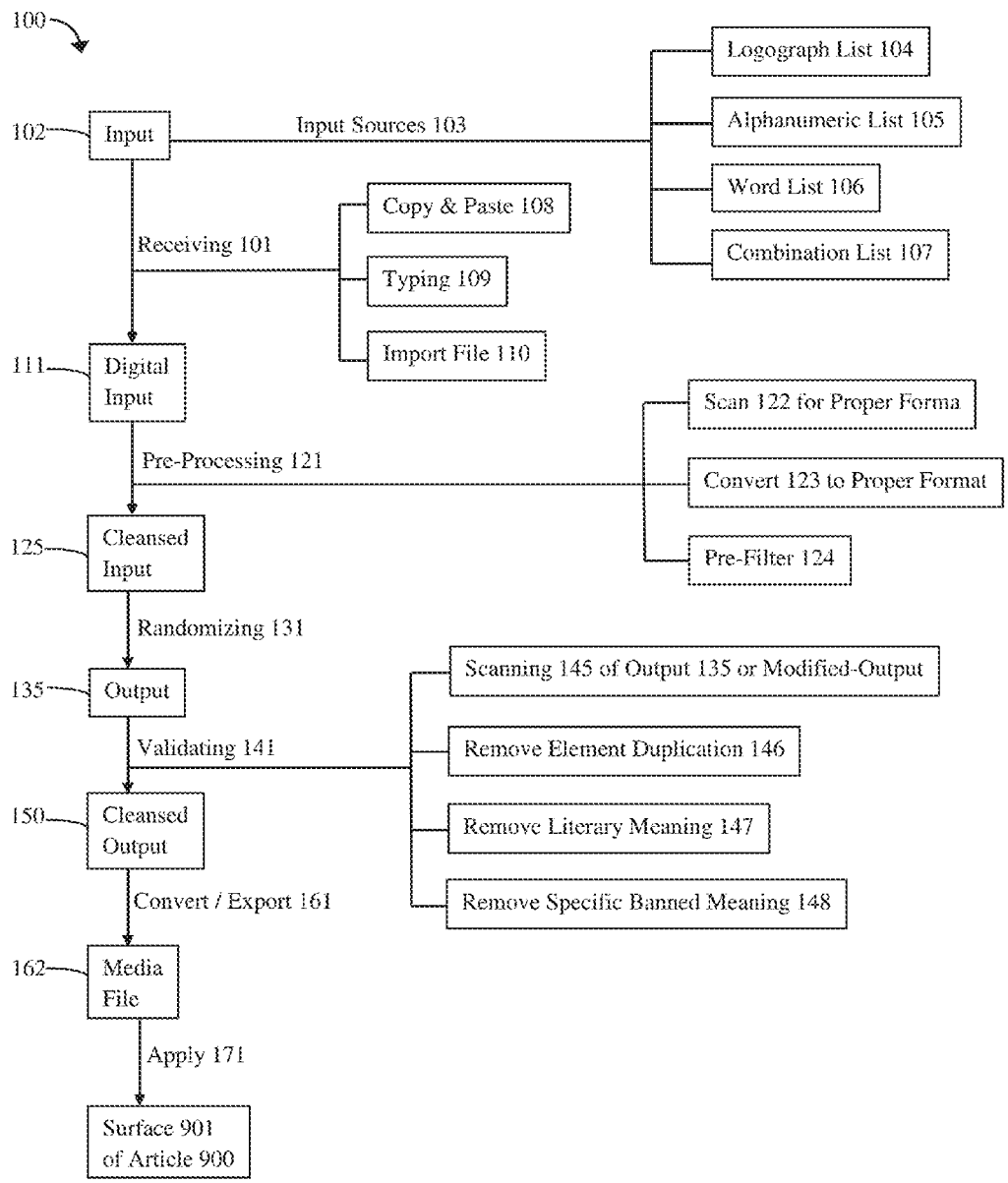
FIG. 1 may depict exemplary global steps of a method for generating random content to be applied to a surface of an article, shown in a flow diagram format.

Below may be a reference numeral schedule organized by numerical order of reference numeral:
100 Method 100
101 Receiving 101
102 Input 102
103 Input Sources 103
104 Logograph List 104
105 Alphanumeric List 105
106 Word List 106
107 Combination List 107
108 Copy & Paste 108
109 Typing 109
110 Import File 110
111 Digital Input 111
121 Pre-Processing 121
122 Scanning 122
123 Convert 123
124 Pre-Filter 124
125 Cleansed Input 125
131 Randomizing 131
135 Output 135
141 Validating 141
145 Scanning 145
146 Removing Element Duplication/Repetition 146
147 Removing Literary Meaning 147
148 Removing Specific Banned Meaning 148
149 Maximum quantity of elements 149 (in output))
150 Cleansed Output 150
161 Converting/Exporting 161
162 Media File 162
171 Applying (Affixing) 171
200 Main Graphical User Interface 200 (Main GUI 200)
201 Start Page GUI 201
202 Separator 202 (delimiter 202)
203 Go To Input Document 203
250 Operational GUI 250
251 Input window 251
252 Output window 252
900 Article 900
901 Surface 901

Below may be reference numeral schedule organized by partial hierarchy (i.e. organized by partial object relationship) as depicted in FIG. 1:
100 Method 100
   101 Receiving 101
      108 Copy & Paste 108
      109 Typing 109
      110 Import File 110
   102 Input 102
   103 Input Sources 103
      104 Logograph List 104
      105 Alphanumeric List 105
      106 Word List 106
      107 Combination List 107
   111 Digital Input 111
   121 Pre-Processing 121
      122 Scanning 122
      123 Convert 123
      124 Pre-Filter 124
   125 Cleansed Input 125
   131 Randomizing 131
   135 Output 135
   141 Validating 141
      145 Scanning 145
      146 Removing Element Duplication/Repetition 146
      147 Removing Literary Meaning 147
      148 Removing Specific Banned Meaning 148
      149 Maximum quantity of elements 149 (in output))
   150 Cleansed Output 150
   161 Converting/Exporting 161
   162 Media File 162
   171 Applying (Affixing) 171
200 Main Graphical User Interface 200 (Main GUI 200)
   201 Start Page GUI 201
      202 Separator 202 (delimiter 202)
      203 Go To Input Document 203

250 Operational GUI 250
251 Input window 251
252 Output window 252
900 Article 900
901 Surface 901

DETAILED DESCRIPTION OF THE INVENTION

A method for generating random content for applying (e.g. affixing) said generated random content to a surface of an article and/or as content for a screen saver type of use is described and disclosed. Said generated random content may be used as artwork, such as graphic artwork and/or as abstract art. An intent of the method may be to take as input any appropriate list (string) of elements and produce (generate) an output list (e.g. a string) of those elements in a random order, wherein that generated random order of element may then be applied to (affixed) the surface of the article and/or wherein that generated random order of element may then be used as display content for a screen saver type of use.

In some embodiments, the elements may be selected from one or more of the group comprising: at least some logographs of an Asian alphabet, at least some logographs of a Chinese alphabet, at least some logographs of a Japanese alphabet, at least some logographs of a Korean alphabet, at least some logographs from a logograph based alphabet, at least some letters of a letter based alphabet, at least some words from a dictionary, and the like.

In some embodiments, the article may comprise a tangible physical object capable of surface ornamentation. For example, and without limiting the scope of the present invention, the article may be selected from the group comprising: a wall, a canvas, paper, wall paper, vinyl (e.g. for various vinyl wraps, including vehicle vinyl wraps), plastics, a sticker, a decal, fabric, textiles, upholstery, clothing, apparel, t-shirts, hats, baseball caps, bandanas, scarfs, coats, jackets, sweaters, hoodies, coffee mugs, drinking glasses, wallets, and the like.

As used herein, "logograph," may be a letter, symbol, or sign used to represent a word, phrase, and/or concept. For example, some languages may consist entirely of logographs. For example, Chinese may be a language comprising entirely of logographs, although such logographs may be written using letters from an alphabet. Note, it may be common practice to refer to "Chinese logographs" as "Chinese characters"; however, in this disclosure the term "logograph" may be used instead of "character," so that this disclosure may use other broader meanings of character with less confusion.

As used herein, "alphabet" may refer to an alphabet of a specific language, e.g. Chinese, Japanese, Korean, English, etc. As used herein, "alphabet" may refer to logograph based alphabets and/or letter (e.g. Latin letter) based alphabets.

As used herein, "dictionary" may be a list of words and common definition of such words. Such dictionaries may be specific to at least one specific language, e.g. Chinese, Japanese, Korean, English, etc.

As used herein, "word" may be sequence of alphanumeric characters (e.g. letters) or logographs separated by white space or common word delimiters (i.e. separators). For example, and without limiting the scope of the present invention, common word delimiters (i.e. separators) may be selected from the group comprising the following characters: space ( ), comma (,), exclamation mark (!), at symbol (@), pound symbol or hash symbol (#), dollar symbol ($), percent symbol (%), caret symbol (^), ampersand symbol (&), asterisk symbol (*), parenthesis ( ), underscore or dash (_), addition sign (+), equals sign (=), set or brackets { }, brackets [ ], vertical bar (|), backward slash (\), colon (:), semicolon (;), quotation mark ("), single quotation mark ('), < >, question mark (?), forward slash (/), tilde symbol (~), and the like. In some embodiments, "words" have a definition as found in a dictionary.

As used herein, "input," "cleansed input," "output," "modified-output," and the like may refer to a list (string) of elements. The elements may be selected from one or more of the group comprising: at least some logographs of an Asian alphabet, at least some logographs of a Chinese alphabet, at least some logographs of a Japanese alphabet, at least some logographs of a Korean alphabet, at least some logographs from a logograph based alphabet, at least some letters of a letter based alphabet, at least some words from a dictionary, and the like. Such lists of elements may be configured as a document, such as a digital document (digital file). "Input" and/or "cleansed input" may be sources for the method, wherein the method may produce from the "input" and/or "cleansed input" the "output" and/or the "modified-output."

In some embodiments, some aspects of the method may be performed by a database application, such as FileMaker and/or equivalent database applications. In some embodiments, the aspects which may be performed by the database application may be: receiving the input, pre-processing the input, randomizing the input to produce the output, validating (and/or post randomization processing of the output, and converting the output into a media file.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 may depict global steps of a method 100 for generating random content to be applied to a surface 901 of an article 900, shown in a flow diagram. In some embodiments, method 100 may comprise the following global steps: (a) receiving 101 an input 102; (b) pre-processing 121 input 102; (c) randomizing 131 input 102 to produce an output 135; (d) validating 141 (and/or conducting post randomization processing of) output 135; (e) converting 161 output 135 into a media file 162; and (f) using media file 162 as a template for reproducing output 135 onto surface 901 of article 900, i.e. applying 171 output 135 to surface 901 of article 900.

In some embodiments, the database and/or software components of method 100 may comprise two algorithms (i.e. subroutines), a first algorithm which may handle pre-processing 121 and a second algorithm which may handle randomizing 131 and validating 141.

In some embodiments, input 102 may be a list of elements. In some embodiments, the elements may be selected from one or more of the group comprising: at least some logographs of an Asian alphabet, at least some logographs of a Chinese alphabet, at least some logographs of a Japanese alphabet, at least some logographs of a Korean alphabet, at least some logographs from an alphabet, at least some letters of an alphabet, at least some words from a dictionary, and the like.

In some embodiments, input 102 may be from input sources 103. Input sources 103 may be a logograph list 104, an alphanumeric list 105, a word list 106, and/or a combination list 107. Combination list 107 may be a combination of other lists, i.e. a combination of logograph list 104, alphanumeric list 105, and/or word list 106. Logograph list 104 may be at least some logographs of an Asian alphabet, at least some logographs of a Chinese alphabet, at least some logographs of a Japanese alphabet, at least some logographs of a Korean alphabet, at least some logographs from an alphabet, and the like. Alphanumeric list 105 may be at least some letters of an alphabet. Word list 106 may be at least one word from a dictionary.

In some embodiments, the step of receiving 101 input 102 may comprise receiving input 102 via one or more of the following receiving means, via: copy and pasting 108, via manual entry, such as typing 109, and/or via importing a file 110. Such receiving means may be accomplished in a graphical user interface (GUI), e.g. a main GUI 200, associated with method 100 that a user may have access to.

In some embodiments, an end result of the step of receiving 101 of input 102 may be digital input 111. In some embodiments, digital input 111 may be a digital file. In some embodiments, the digital file may comprise a list of elements. The elements may be selected from one or more of the group comprising: at least some logographs of an Asian alphabet, at least some logographs of a Chinese alphabet, at least some logographs of a Japanese alphabet, at least some logographs of a Korean alphabet, at least some logographs from an alphabet, at least some letters of an alphabet, at least some words from a dictionary, and the like.

Note, some such input 102 lists may comprise more than one hundred thousand elements, e.g. unique logographs. For example, and without limiting the scope of the present invention, the Chart of Common Characters of Modern Chinese may comprise approximately 3,500 Chinese logographs. For example, and without limiting the scope of the present invention, the Chart of Generally Utilized Characters of Modern Chinese may comprise approximately 7,000 Chinese logographs. For example, and without limiting the scope of the present invention, the Great Compendium of Chinese Characters or "Hanyu Da Zidian" (汉语 大字典) (Hànyǔ dà zìdiǎn) may comprise approximately 54,678 Chinese logographs. For example, and without limiting the scope of the present invention, the Dictionary of Chinese Variant Form (华字海) (Zhōnghuá zì hǎi) and also known as the "Yìtǐzì zìdiǎn" (异体字字典) may comprise approximately 106,230 Chinese logographs.

In some embodiments, after input 102 may be received 101, digital input 111 may be pre-processed 121 to ensure that all elements contained in digital input 111 may be identified by method 100, particularly in the randomizing 131 and validating 141 steps. In the simplest terms, in some embodiments, pre-processing 121 may ensure that a space character (or equivalent) exists between any elements so that each of these elements may be read, randomized, and validated.

In some embodiments, the step of pre-processing 121 of input 102 or digital input 111 may comprise the steps of: scanning 122 for proper format, pre-processing of input 102 or digital input 111 to convert 123 into the proper format of cleansed input 125, and/or conducting pre-filtering 124. An end product of pre-processing 121 may be a cleansed input 125. Essentially, pre-processing 121 may involve making sure input 102 or digital input 111 may be in a state that method 100 may be able to read and conduct subsequent steps, such as randomizing 131 and/or validating 141.

In some embodiments, pre-processing 121 of input 102 or digital input 111 may comprise scanning 122 input 102 or digital input 111 to determine if input 102 or digital input 111 may in the proper format for the randomizing 131 step. If scanning 122 may determine that input 102 or digital input 111 may be in the proper format, then method 100 may proceed to the randomizing 131 step, i.e. no pre-processing may be required and input 102 or digital input 111 may be deemed cleansed input 125.

If scanning 122 may determine that input 102 or digital input 111 may not be in the proper format, then the pre-processing may convert 123 input 102 or digital input 111 into cleansed input 125. Cleansed input 125 may be in the proper form.

In some embodiments, the proper form may be a list of elements, wherein each element in the list may be separated by a separator (i.e. a delimiter).

In some embodiments, the separator (delimiter) may be selected from the group comprising the following characters: space ( ), comma (,), exclamation mark (!), at symbol (@), pound symbol or hash symbol (#), dollar symbol ($), percent symbol (%), caret symbol (_), ampersand symbol (&), asterisk symbol (*), parenthesis ( ) underscore or dash (), addition sign (+), equals sign (=), set or brackets { }, brackets [ ], vertical bar (|), backward slash (\), colon (:), semicolon (;), quotation mark ("), single quotation mark ('), < >, question mark (?), forward slash (/), tilde symbol (~), and the like.

For example, and without limiting the scope of the present invention, pre-processing 121 with respect to ensuring proper element spacing may comprise the following steps: Start reading the elements of digital input 111 from left to right and top to bottom. Note, in other embodiments, other reading frames may be used. The "first character" in digital input 111 may be referred to as the "current character." If the "current character" may be an Asian language logograph as described above, then append it to the text of an "intermediate document' and also append a space (' ') character to the text of the intermediate document immediately to the right of the appended asian language logograph. If the "current character" may not be an Asian language logograph then simply append it to the text of the intermediate document without adding a space (' ') character. A "last character" (i.e. previous) to be appended to the "intermediate document" may be referred to as the "previous character." A "next character" (i.e. one following the current "current character") in the sequence of elements of digital input 111 may now become the "current character." If the "current character" may be an asian language logograph and the 'previous character" is not a space (' ') then append a space (' ') character to the "intermediate document." Append the "current character'" to the "intermediate document." The instructions in this paragraph may be repeated until the "last character" in the sequence of elements from digital input 111 may be appended to the text of the "intermediate document." This "intermediate document" may then be the cleansed input 125. For example, this pre-processing 121 algorithm may be accomplished with the following pseudo code:

```
START
010     Go To First Character
030     IF character is logogram and previous character is not Space and
        is not null
040     Append a space character to InWords
050     END IF
060     Append current character to InWords
```

```
070    IF character is logogram
080    Append a space character to InWords
090    END IF
100    Select next character
110    IF current character is the last character
120    Append current character to InWords
130    GOTO END
140    ELSE
150    GOTO 030
160    END IF
END
```

At the end of the above algorithm the 'InWords' value may contain a string of elements that may be properly separated by element separators, i.e. cleansed input 125.

In some embodiments, the list of elements when in the proper format may begin with a begin list character. The begin list character may be a command recognized by the database application that a list may be beginning. In some embodiments, the list of elements when in the proper format may end with an end list character. The end list character may be a command recognized by the database application that a list may be ended.

In some embodiments, pre-filtering 124 of digital input 111 or input 102 may comprise scanning digital input 111 or input 102 to check if any element in digital input 111 or input 102 may be listed (i.e. appear) more than once. If any element in digital input 111 or input 102 may be listed more than once, then pre-filtering 124 may remove (e.g. by deleting) any subsequent listings of the repeated element. Note, this pre-filtering 124 step of removing duplicated elements, may also be performed post randomizing 131, e.g. in validation 141.

In some embodiments, randomization 131 may basically be a process of choosing elements at random from a source document (e.g. digital input 111 or cleansed input 125) and appending them to a new document (e.g. output 135) in the order of their selection. Which and how many elements appended to output 135 may be limited by the user's preference.

In some embodiments, randomizing 131 input 102, digital input 111, or cleansed input 125 to produce output 135 may result in output 135 comprising a list of random ordered elements. The elements may be supplied from input 102, digital input 111, or cleansed input 125. Such a list of random elements of output 135 may be in a random order as compared to the order of elements in input 102, digital input 111, or cleansed input 125.

In some embodiments, randomizing 131 may operate in an iterative fashion by selecting and removing, at random, one element from input 102, digital input 111, or cleansed input 125 and then adding that element to output 135, and then repeating until no more elements remain in input 102, digital input 111, or cleansed input 125.

In some embodiments, randomizing 131 (and validating 141 occurring with randomizing 131) may comprise method 100 first creating a "selection set." The "selection set" may be set of all the elements that may exist in digital input 111 or cleansed input 125. An element may then be randomly chosen and removed from the "selection set" as a "candidate" to possible append to cleansed output 150. At least three tests (filters) may be applied to the candidate element to determine if the candidate element may be appended to cleansed output 150. In some embodiments, these three tests may be: (1) Is the candidate element the same as an element previously added to cleansed output 150 and is method 100 set to reject duplicate elements in cleansed output 150? (2) Does the candidate element match any of elements in the set of banned (restricted) elements/words? (3) When appended to cleansed output 150 will the candidate element complete a phrase yielding literary meaning per a reference dictionary? If any of the above tests may be true then the element may not be appended to cleansed output 150. If none of the above tests are true then the candidate element may be appended to cleansed output 150. This process (random element selection, testing, and appending) may be repeated until either the number of elements in cleansed output 150 may match a maximum allowed number of elements in cleansed output 150, or there are no more elements remaining in the "selection set."

For example, and without limiting the scope of the present invention, randomizing 131 and validating 141 algorithm may, in some embodiments, may comprise the following pseudo code:

```
START
010    Generate indexed copy of source elements (e.g. InWords from
       above pre-processing 121 algorithm) named as WDS
020    Set OutWords to an empty string
030    IF WDS.WordCount < 1 (there are no more words in WDS)
040    GOTO END
050    END IF
060    IF OutWords.WordCount < MaxOutWords (user has set a limit
       on the number of words)
070    GOTO END
080    END IF
090    SELECT RANDWD (a word at an index between 0 and the
       number of words in WDS)
100    IF RANDWD is a duplicate of a word in OutWords AND no
       duplicates are allowed
110    REMOVE duplicated RANDWD from WDS
120    CLEAR RANDWD
130    GOTO 090
140    END IF
150    IF RANDWD completes a restricted phrase
160    IF WDS.WordCount < 2
170    Remove first three words from OutWords and Insert into WDS
180    END IF
190    CLEAR RANDWD
200    END IF
210    IF RANDWD is not cleared
220    APPEND RANDWD to OutWords
230    Remove RANDWD from WDS
240    END IF
250    GOTO 30
END
```

At the end of the above algorithm the "OutWords" value may contain the desired output, i.e. cleansed output 150.

In some embodiments, randomizing 131 may operate by assigning a sequential number to each element in input 102, digital input 111, or cleansed input 125 and then running such a created pool of sequential numbers through a random number generator that is limited by the highest assigned sequential number. When in each successive iteration, the prior generated random number may be removed from eligibility such that the random number generator may not re-generate that same number in the current iteration.

In some embodiments the step of validating 141 may be synonymous with some post randomization processing steps. In some embodiments the step of validating 141 may be scanning 145 output 135 for at least one of three particular problems and then fixing found problems. These three particular problems may be a problem of duplication (or repetition), a problem of literary meaning, and/or a problem of specifically banned elements appearing in output 135.

For example, and without limiting the scope of the present invention, the problem of duplication (repetition) may involve an element being appearing more than once in output 135, which in some embodiments may be not be desirable.

For example, and without limiting the scope of the present invention, the problem of literary meaning may involve a group of consecutive elements appearing in output 135 that may have some literary meaning according to a reference dictionary, which in some embodiments may be not be desirable. The step of randomizing 131 may by chance produce words or other groupings of consecutive elements that may have some literary meaning.

For example, and without limiting the scope of the present invention, the problem of a specifically banned group of consecutive elements appearing in output 135 may involve a group of consecutive elements that the user may have expressly entered into method 100 that are to be expressly removed from appearing in output 135 or in cleansed output 150. Such specifically banned elements may correspond to words and/or language which may be offensive, profane, obscene, slang, sexual, racist, and/or in some way not desirable to appear in output 135 or in cleansed output 150.

In some embodiments, validating 141 may comprise one or more steps of removing 146 duplicated elements from output 135, removing 147 literary meaning from output 135, and/or removing 148 specific (explicit) banned meaning from output 135. Each of these three validating 141 steps (i.e. 146, 147, and/or 148) may proceed in an iterative fashion, wherein output 135 may first be scanned 145, then if a particular problem may be found, the problem may be removed, which may result in a modified-output, wherein the modified-output may then be re-scanned for the particular problems. If no further particular problem may be found, then that modified-output may be deemed cleansed output 150. Whereas, if another particular problem may be found, the problem may be removed, creating yet another modified-output which again may then be re-scanned and so on until a modified-output may be generated with no found problems, i.e. cleansed output 150. In some embodiments, a maximum number of iterations and/or a time limit may be set to prevent method 100 from getting stuck in a self repeating iterative loop of scanning 145.

In some embodiments, validating 141 (and/or post randomization processing of) output 135 may comprise scanning 145 output 135 to check if any element in output 135 may be listed (i.e. appear) more than once. If any element in output 135 may be listed more than once, then validation 141 may remove 146 (e.g. by deleting) any subsequent listings of the repeated element. Note, this validation step of removing duplicated elements, may also be performed prior to randomizing 131, e.g. in pre-processing 121 (e.g. pre-filtering 124).

In some embodiments, validating 141 (and/or post randomization processing of) output 135 may comprise scanning 145 each two or more consecutive elements in output 135 to check if any two or more consecutive elements in output 135 may appear in a reference dictionary (e.g. if two or more consecutive elements form a word). If any two or more consecutive elements in output 135 may appear in the reference dictionary, then validation 141 may remove 147 (e.g. by deleting) at least one of the elements that may appear in the two or more consecutive elements that may appear in the reference dictionary from output 135. This removal 147 may produce a modified-output. Then validation 141 may scan 145 the modified-output looking for if any two or more consecutive elements in the modified-output may appear in the reference dictionary and then removing 147 any such found element and if no such elements may be found in output 135 or in the modified-output, then method 100 may proceed to converting 161 output 135 or the modified-output into media file 162. That is, once no literary meaning may be found in output 135 or in the modified-output, then such output may be deemed cleansed output 150.

Note, in general, removal 147 of literary meaning may proceed by deletion and/or re-randomizing the two or more consecutive elements where literary meaning may have been found upon a scan.

In some embodiments, validating 141 (and/or post randomization processing of) output 135 may comprise scanning 145 each two or more consecutive elements in output 135 to check if any two or more consecutive elements in output 135 may appear in the reference dictionary. If any two or more consecutive elements in output 135 may appear in the reference dictionary, then validation 141 may accomplish removal of the literary meaning by randomizeing the two or more consecutive elements in output 135 that may have appear in the reference dictionary to produce a modified-output. Then validation 141 may performs scan 145 of the entire modified-output looking for if any two or more consecutive elements in the modified-output may appear in the reference dictionary. If no such elements may be found in output 135 or in the modified-output, then method 100 may proceed to converting output 135 or the modified-output into media file 162. Whereas, if further such elements may be found with literary meaning in the modified-output, then offending elements may be re-randomized and this validation 141 step may cycle back to a beginning of the validation 141 step to reiterate the step. Once scan 145 of output 135 or of the modified-output finds no problems, then such an output may be deemed cleansed output 150.

In some embodiments, once scan 145 of output 135 or of the modified-output finds no problems or the maximum iterations threshold may have been reached or the timer reached, then such an output may be deemed cleansed output 150. In some embodiments, method 100 may then take cleansed output 150 and convert 161 and/or export 161 cleansed output 150 into media file 162.

In some embodiments, media file 162 may be a digital media file. For example, and without limiting the scope of the present invention, in some embodiments, media file 162 may be selected from one or more of the group comprising: Rich Text document (RTF), Microsoft Word document (DOC), Microsoft Word for Mac document (DOCM), Office Open XML document (DOCX), Microsoft Word document template (DOT), Office Open XML text document template (DOTX), Portable Document Format (PDF), HyperText Markup Language (HTML), ASCII text (ASC), ASCII nebo Unicode plaintext Text file (TXT), Adobe Illustrator Document (AI), WordPerfect document (WPD), Microsoft Works document (WPS), Microsoft Works document template (WPT), Lotus Word Pro (LWP), Microsoft PowerPoint template (POT), Microsoft PowerPoint Show (PPS), Microsoft PowerPoint Presentation (PPT), graphic image files, audio files, video files, and the like. This list of media files is not intended to be inclusive. It is obvious that other media files also are within the scope of the present invention.

A choice of media file 162 may be driven by what type of article 900 surface 901 that cleansed output 150 may be applied to. For example, if media file 162 may be for digital image printing to form a wall mural, then a graphics oriented medial file 162 may be chosen.

In some embodiments, the user may decide and/or choose from various operational configurations, that may set certain properties for cleansed output 150. In some embodiments, method 100 may receive at least one command instructing method 100 as to an option or limitation in operating method 100. In some embodiments, the at least one command may be selected from one or more of the group comprising: specifying a digital file as a source for the input (e.g. import file 110); specifying a maximum quantity of elements within input 102 or digital input 111; specifying a maximum quantity 149 of elements that may be listed in output 135 or in the modified-output or in cleansed output 150; specifying how many times an element may be permitted to be listed in output 135 or in the modified-output or in cleansed output 150; specifying the reference dictionary (e.g. as a particular digital file); specifying words and/or particular consecutive logographs to be expressly omitted from output 135 or in the modified-output or in cleansed output 150; specifying a type of media file 162; and the like.

Note, in some embodiments, a reading order of method 100 may be from left to right and from top to bottom. In other embodiments, the reading order may be from right to left. In some embodiments, a same reading frame may be applied to input 102, digital input 111, cleansed input 125, output 135, the modified-output, and cleansed output 150.

In some embodiments, article 900 may be a tangible physical object capable of receiving and/or displaying various surface ornamentation. For example, and without limiting the scope of the present invention, article 900 may be selected from the group comprising one or more of: a wall, a canvas, paper, wall paper, vinyl (e.g. for various vinyl wraps, including vehicle vinyl wraps), plastics, a sticker, a decal, fabric, textiles, upholstery, clothing, apparel, t-shirts, hats, baseball caps, bandanas, scarfs, jackets, coffee mugs, drinking glasses, and the like. In applying 171 cleansed output 150 to surface 901 of article 900, in some embodiments, cleansed output 150 may be printed directly onto surface 901. In other embodiments, applying 171 cleansed output 150 to surface 901 of article 900 may be done manually using media file 162 as a template to print to onto various intermediate templates. The intermediate templates may then be adhered to, or otherwise attached to, various surfaces 901 of articles 900. In some embodiments, the intermediate templates may comprise various types of paper, various types of vinyl, various types of banners, various types of wallpaper, and the like. Some other manual methods of transferring cleansed output 150 to various surfaces 901 of articles 900 may comprise: painting, drawing, calligraphy, collage, other like art techniques.

In some embodiments, cleansed output 150 may be used as content for various custom wall murals, custom billboards, custom building wraps, and/or custom vehicle wraps. Various digital printers may be used to print one or more strips, for example and without limiting the scope of the present invention, from three feet to 300 feet, to then build the desired final image using such one or more printed strips. Digital printer resolution, such as 1,440 dpi (dots per inch), may only be limited by the current state of the art in digital printer resolution.

In some embodiments, cleansed output 150 may be printed onto various surfaces 901, wherein one or more logographs printed may then be die cut, such that the individual die cuts of the one or more logographs may then be arranged in particular patterns.

In some embodiments, cleansed output 150 may be used as content for a screen saver type of use for application on various electronic devices which may comprise a screen.

Figure 2A:
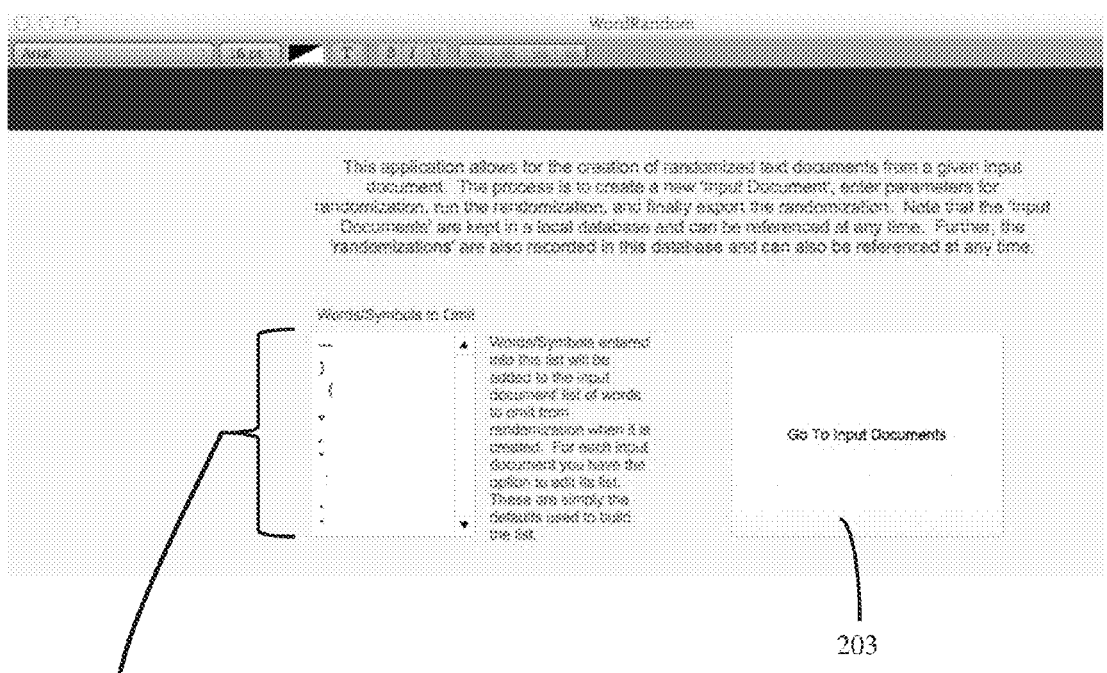
FIG. 2A may depict a screenshot of a Start Page Graphical User Interface (Start Page GUI), i.e., an opening start screen of a software module that may be used to generate random content for the method.
Figure 2B:
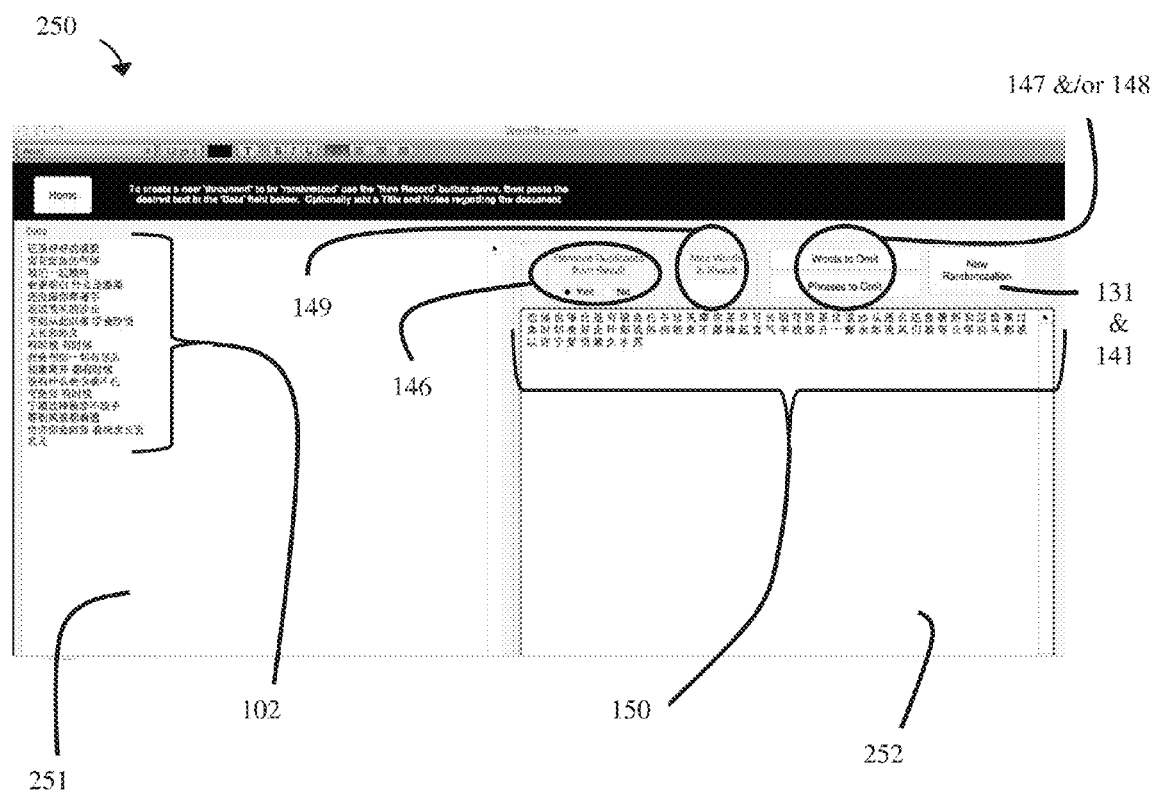
FIG. 2B may depict a screenshot of an Operational GUI, i.e., a (GUI) of the software module that may be used to generate random content, wherein a user may interact with the method to generate random content for the method.

FIG. 2A and FIG. 2B may depict screenshots of software associated with implementing some steps of method 100. Note, such software in some embodiments, may not perform the step of applying 171 cleansed output 150 (e.g. as found in medial file 162) to surface 901 of article 900. These two screenshots may be depict main GUI 200. In some embodiments, GUI 200 may comprise Start Page GUI 201 and Operational GUI 250. In some embodiments, main GUI 200 may also display various screens, some of which may not be interacted with, which may display various status updates or progress reports of some of the steps associated with method 100.

FIG. 2A may depict a screenshot of a Start Page GUI 201, i.e., the opening start screen of the software module that may be used to generate random content for method 100. May comprise some text based notices, such as which separators 202 (delimiters 202) may be used and a button, Go To Input Documents 202. The user clicking on Go To Input Documents 202 may then be taken to Operational GUI 250.

FIG. 2B may depict a screenshot of Operational GUI 250, i.e. the GUI of the software module that may be used to generate random content, wherein the user may interact with method 100 to generate random content for method 100. As depicted in FIG. 2B, in some embodiments, a region on a left side of Operational GUI 250 may depict a window for entering inputs 102, wherein such a window may be termed input window 251. In some embodiments, inputs 102 may be manually entered into input window 251, e.g. by typing 109. In some embodiments, inputs 102 may be entered into input window 251, e.g. by copying and pasting 108 from some source document. In some embodiments, not shown in FIG. 2B, inputs 102 may be entered into input window 251 by importing file 110.

Operational GUI 250 may comprise several other areas for the user to interact with method 100. Operational GUI 250 may comprise a means for removing element duplication/repetition 146 (e.g. by a yes/no option selection), maximum quantity of elements 149 in output (e.g. by entering a positive numerical value), removing literary meaning 147 and/or removing specific banned meaning 148 (e.g. by words to omit and/or by phrases to omit), randomizing 131 and validating 141 (e.g. by a button styled as "New Randomization").

As depicted in FIG. 2B, in some embodiments, a region on a right side of Operational GUI 250 may depict a window for viewing output 135 and/or cleansed output 150, wherein such a window may be termed output window 252. Population of output window 252 may occur after the user clicks the "New Randomization" button, which may cause method 100 to perform the randomizing 131 and validating 141 steps. In some embodiments, content of output window 252 (output 135 and/or cleansed output 150) may be cut and paste into other applications.

In some embodiments, upon starting method 100 the user may be taken to an operational GUI. The operational GUI, e.g. operational GUI 250, may be the only area where the user may enter/submit commands for choosing/selecting various options and limitations. In some embodiments, from the operational GUI, the user may take the following actions: (1) enter a new input 102, edit an existing input 102 (or digital input 111); (2) change/select various options and/or limitations, including changing input 102; (3) export 161 a current output (e.g. cleansed output 150) to media file 162 (e.g. export into a plain text file); (4) run randomization 131 upon an existing input (e.g. cleansed input 125); and/or (5) exit method 100.

Recall with respect to action (1) in the immediately preceding paragraph, in some embodiments, the step of receiving 101 input 102 may comprise receiving input 102 via one or more of the following receiving means, via: copy and pasting 108, via manual entry, such as typing 109, and/or via importing a file 110.

Note, there may be no specific order in which the above actions must be taken; however, it should be noted that there may be a sensible order of actions that the user might take. For instance, the user might not elect to export media file 162 prior to cleansed output 150 being created by randomization 131 and validation 141 processes.

Note, pre-processing 121 in some embodiments may occur automatically in method 100 once method 100 receives input 102.

Note, validation 141 may immediately proceed upon randomization 131 completion without any user notification nor user interaction.

In some embodiments, upon method 100 receiving 101 input 102, pre-processing 121 may begin automatically. In practice, this step may occur upon exiting an input field of method 100. In some embodiments, during pre-processing 121 the elements contained within input 102 may be indexed and prepared for randomization 131. For example, scanning 122, converting 123 to the proper format, and/or pre-filtering 124 may occur during pre-processing 121. A dialog window may be displayed informing the user the percentage of completion of pre-processing 121. When pre-processing 121 may be complete the user may be returned to the operational GUI.

In some embodiments, from the operational GUI, the user may select running randomization 131, assuming there is cleansed input 125 to operate upon (or use an input source). During randomizing 131, a dialog window may be displayed informing the user the percentage of completion of randomizing 131. In some embodiments, the dialog window may also display a sample of output 135, e.g. approximately 200 elements may be pre-viewed. In some embodiments, upon completion of, method 100 may navigate back to operational GUI. In some embodiments, method 100 may display both input 102 and cleansed output 150 side by side or at least a portion of each, see e.g., FIG. 2B.

In some embodiments, from the operational GUI, when convert/export 161 option may be selected, the user may also provide a file name and file storage location for media file 162. Upon completion of convert/export 161 media file 162 may exist at the user specified storage location. The storage location may be computer readable media that may be configured to non-transitorily store media file 162.

In some embodiments, the database and/or software components of method 100 may comprise a database application, such as FileMaker Pro database application. Such an application may run in either Windows or Mac operating platforms. In other embodiments, other database application software may be used to implement method 100. Additionally, in some embodiments, such an application may allow the user to produce media file 162, such as a plain text document containing the text of cleansed output 150 (or output 135). This may allow for portability of cleansed output 150 (or output 135). Various media files 162 may be used in just about any other software based application for physical printing (or electronic printing) and/or for consumption by another software application.

A method for generating random content for applying (e.g. affixing) said generated random content to a surface of an article and/or as content for a screen saver type of use has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for generating random content to be applied to a surface of an article, comprising the steps of:
    (a) receiving an input;
    (b) pre-processing the input;
    (c) randomizing the input to produce an output;
    (d) validating the output; wherein this validating step comprises scanning each two or more consecutive elements in the output checking if any of the two or more consecutive elements in the output appear in a reference dictionary; wherein if any of the two or more consecutive elements in the output appear in the reference dictionary, then the two or more consecutive elements in the output that appeared in the reference dictionary are randomized to produce a modified-output; wherein this validating step further comprises scanning the modified-output for if any two or more consecutive elements in the modified-output appear in the reference dictionary; and if none of the two or more consecutive elements in the output are found in the reference dictionary or if none one of the two or more consecutive elements in the modified-output are found in the reference dictionary, then the method proceeds to step (e); wherein if the two or more consecutive elements in the modified-output are found in the reference dictionary, then the two or more consecutive elements of the modified-output are re-randomized to produce yet another modified-output and this validation step cyclically iterates to scanning of the yet another modified-output for presence of two or consecutive elements of the yet another modified-ouput appearing in the reference dictionary;
    (e) converting the output, the modified-output, or the yet another modified-output into a media file; and
    (f) using the media file as a template for reproducing at least some portion of the output, the modified-output, or the yet another modified-output onto the surface of the article.

2. The method for generating random content to be applied to the surface of the article according to claim 1, wherein the input is a list of elements, wherein the elements are selected from one or more of the group consisting of: at least some logographs of an Asian alphabet, at least some logographs of a Chinese alphabet, at least some logographs of a Japanese alphabet, at least some logographs of a Korean alphabet, at least some logographs from an alphabet, at least some letters of an alphabet, and at least some words from a dictionary.

3. The method for generating random content to be applied to the surface of the article according to claim 1, the step of receiving the input results in generation of a digital file, wherein the digital file comprises a list of elements, wherein the elements from the list of elements are selected from one or more of the group consisting of: at least some logographs of an Asian alphabet, at least some logographs of a Chinese alphabet, at least some logographs of a Japanese alphabet, at least some logographs of a Korean alphabet, at least some logographs from an alphabet, at least some letters of an alphabet, and at least some words from a dictionary.

4. The method for generating random content to be applied to the surface of the article according to claim 1, wherein pre-processing of the input comprises scanning the input to determine if the input is in a proper format for the randomizing step; wherein if the scanning determines that the input is in the proper format, then the method proceeds to the randomizing step; wherein if the scanning determines that the input is not in the proper format, then the pre-processing converts the input into a cleansed input; wherein the cleansed input is in the proper form.

5. The method for generating random content to be applied to the surface of the article according to claim 4, wherein the proper form is a list of elements, wherein each element in the list of elements is separated by a separator.

6. The method for generating random content to be applied to the surface of the article according to claim 5, wherein the separator is selected from the group consisting of: a space character, a hyphen character, a slash character, a comma character, and a semicolon character.

7. The method for generating random content to be applied to the surface of the article according to claim 4, wherein the proper form is a list of elements, wherein each element in the list of elements is separated by a separator; and wherein the list of elements begins with a begin list character.

8. The method for generating random content to be applied to the surface of the article according to claim 4, wherein the proper form is a list of elements, wherein each element in the list of elements is separated by a separator; and wherein the list of elements ends at an end list character.

9. The method for generating random content to be applied to the surface of the article according to claim 1, wherein the step (c) of randomizing the input to produce the output results in the output comprising a list of random ordered elements; wherein these elements in the list of random ordered elements are supplied from the input; wherein the list of random ordered elements of the output is in a random order as compared to the order of these elements in the input.

10. The method for generating random content to be applied to the surface of the article according to claim 1, wherein randomizing operates in an iterative fashion by selecting and removing, at random, one element from the input and adding that element to the output, and then repeating until no more elements remain in the input.

11. The method for generating random content to be applied to the surface of the article according to claim 10, wherein the randomizing step (c) operates by assigning a sequential number to each element in the input and then running such a created pool of sequential numbers through a random number generator that is limited by a highest assigned sequential number.

12. The method for generating random content to be applied to the surface of the article according to claim 1, wherein the validating step (d) further comprises scanning the output to check if any element in the output is listed more than once; wherein if any element in the output is listed more than once, the validation removes any subsequent listings of the repeated element.

13. The method for generating random content to be applied to the surface of the article according to claim 1, wherein the randomizing in the validation step (d) comprises removal of at least one of the elements that appeared in the two or more consecutive elements appearing in the reference dictionary.

14. The method for generating random content to be applied to the surface of the article according to claim 1, wherein the article is a tangible physical object capable of surface ornamentation.

15. The method for generating random content to be applied to the surface of the article according to claim 1, wherein the method receives at least one command instructing the method as to an option or limitation in operating the method.

16. The method for generating random content to be applied to the surface of the article according to claim 15, wherein the at least one command is selected from one or more of the group consisting of: specifying a digital file as a source for the input, specifying a maximum quantity of elements within the input, specifying a maximum quantity of elements listed in the output or in a modified-output, specifying how many times an element is permitted to be listed in the output or in the modified-output, specifying a reference dictionary, specifying words and/or particular consecutive logographs to be omitted from the output or modified-output, and specifying a type of media file.

\* \* \* \* \*